United States Patent [19]
Berger

[11] Patent Number: 6,154,357
[45] Date of Patent: Nov. 28, 2000

[54] PROCESS FOR IMPREGNATION OF ELECTRICAL CAPACITORS

[75] Inventor: Noëlle Berger, Ecully, France

[73] Assignee: Elf Atochem S.A., France

[21] Appl. No.: 09/443,431

[22] Filed: Nov. 19, 1999

Related U.S. Application Data

[63] Continuation of application No. 09/016,447, Jan. 30, 1998, Pat. No. 6,010,743.

[30] Foreign Application Priority Data

Jan. 31, 1997 [FR] France .................................. 97 01079

[51] Int. Cl.⁷ ................. H01G 4/22; B05D 5/12
[52] U.S. Cl. ............... 361/314; 361/315; 427/79; 427/80
[58] Field of Search .................. 361/311–313, 314–319; 427/79–81, 430.1; 29/25.41, 25.42

[56] References Cited

U.S. PATENT DOCUMENTS

| | | | |
|---|---|---|---|
| 1,989,046 | 1/1935 | Robinson | 361/317 |
| 3,573,575 | 4/1971 | Brady et al. | 361/315 |
| 3,588,643 | 6/1971 | Ross et al. | 361/304 |
| 5,081,758 | 1/1992 | Sato et al. | 29/25.41 |
| 5,545,355 | 8/1996 | Commandeur et al. | 252/570 |

FOREIGN PATENT DOCUMENTS 31 17 318 A1  4/1982  Germany .

*Primary Examiner*—Anthony Dinkins
*Attorney, Agent, or Firm*—Millen, White, Zelano & Branigan, P.C.

[57] ABSTRACT

The invention relates To a process for the impregnation of electrical capacitors which includes performing the impregnation of the coil winding with a dielectric fluid, eliminating the excess of the dielectric fluid, filling the casing containing the impregnated coil winding with a gelable composition and the dielectric fluid for impregnating the coil winding and gelling the gelable composition.

18 Claims, 2 Drawing Sheets

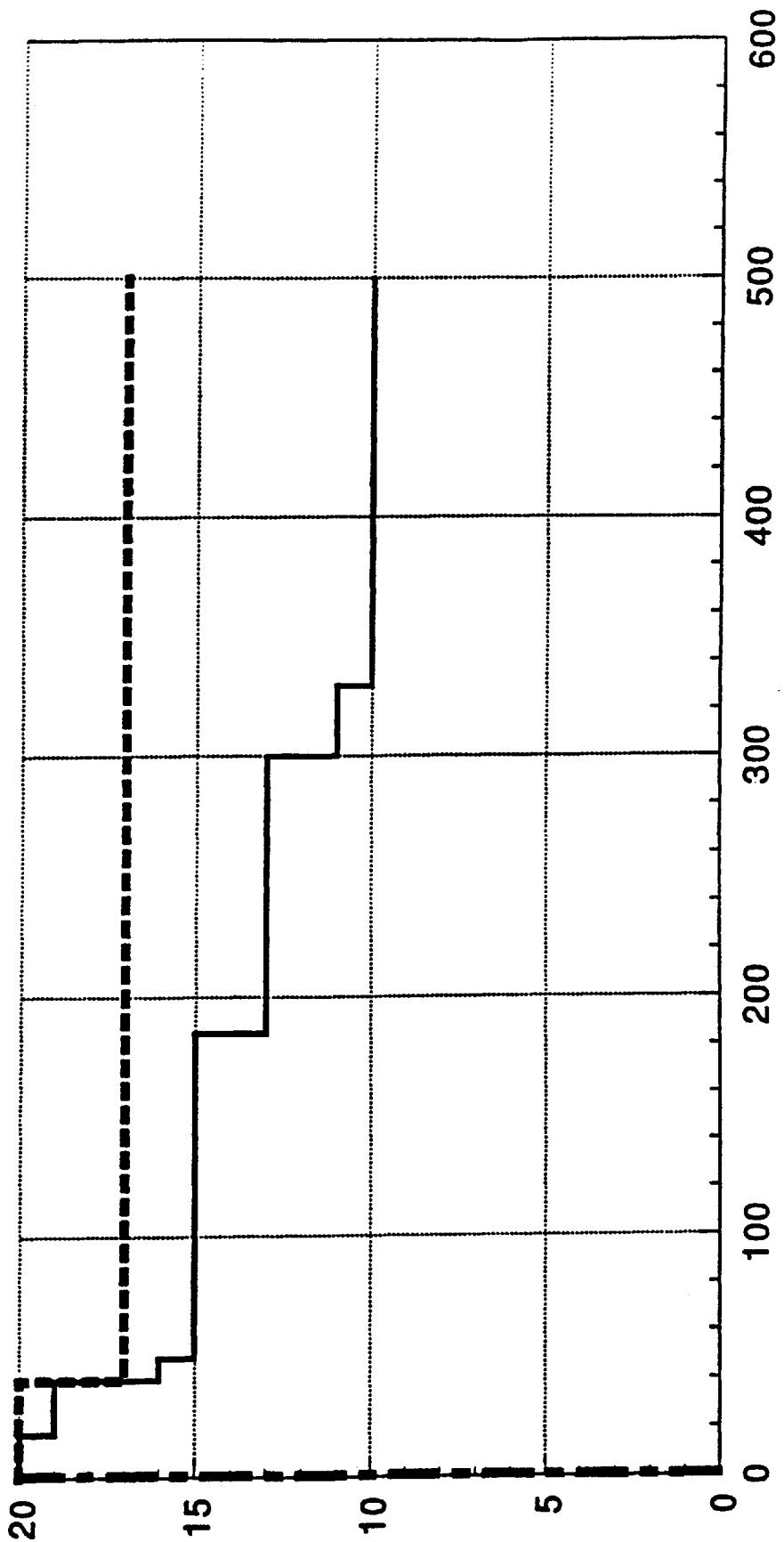

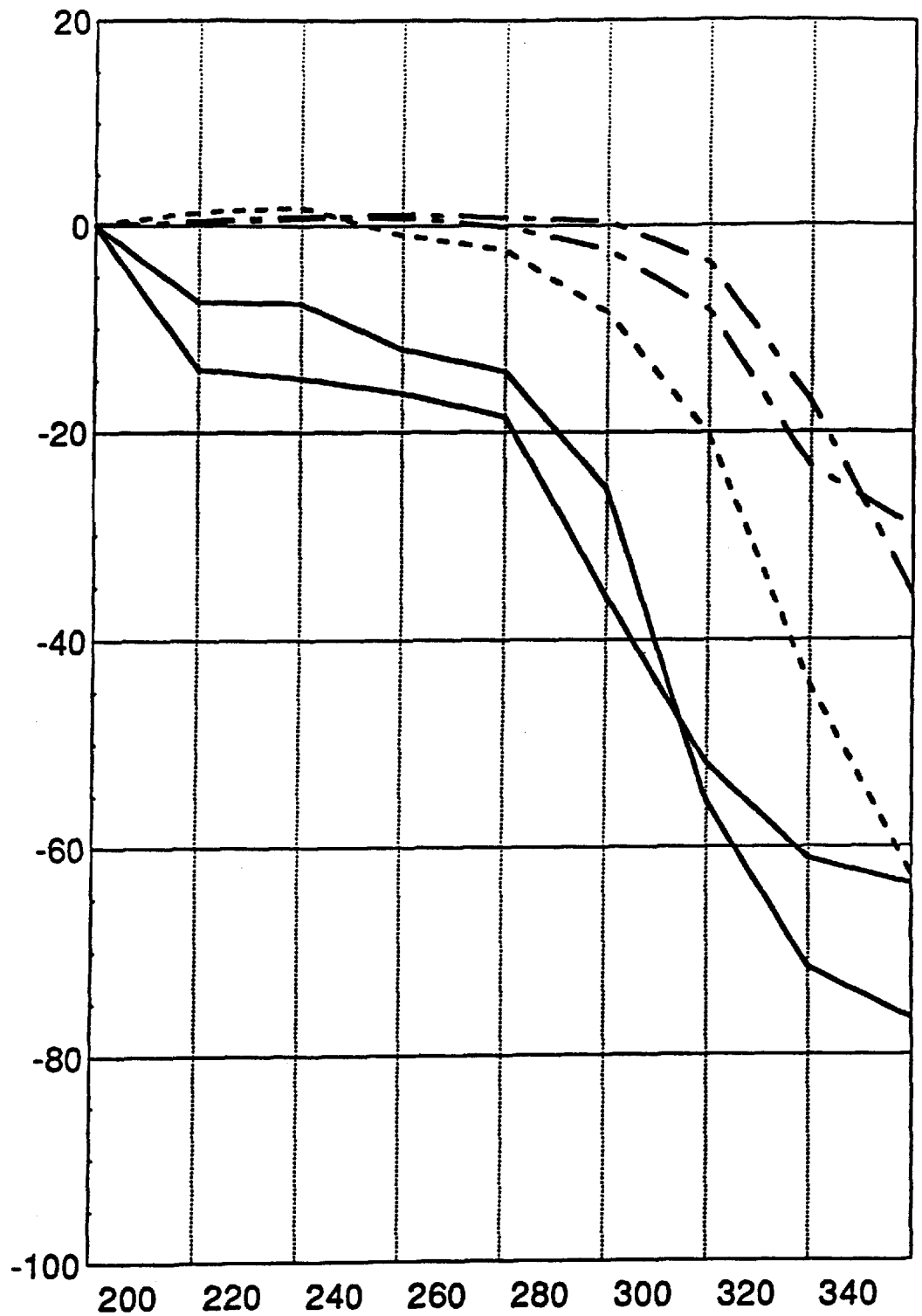
GRAPH 2

PROCESS FOR IMPREGNATION OF ELECTRICAL CAPACITORS

This is a continuation of application Ser. No. 09/016,447 filed Jan. 30, 1998, now U.S. Pat. No. 6,010,743.

BACKGROUND OF THE INVENTION

The invention relates to a process for double impregnation of electrical capacitors which can be employed especially for alternating voltage (50 Hz) and for direct voltage with discharge and/or with phase inversion.

The capacitors involved may have armatures which are metallized or else consisting of aluminum sheet.

U.S. Pat. No. 1,989,046 describes a process for impregnation of electrical capacitors which consists in impregnating, in a first step, windings consisting of sheets of paper and of sheets of metal with an oil which has a high dielectric constant, such as castor oil, and then, in a second step, the said suitably impregnated windings are introduced into a casing filled with a sufficient quantity of a mineral oil in order to coat the said windings completely.

The mineral oil present in the casing must have high flash and boiling points and must be chemically inert.

This procedure has the disadvantage that the two liquids can mix and thus in the long term entail a deterioration of the windings which might be only partially impregnated with the dielectric oil.

In addition, in the case of breakdown with rupture of the casing and inflammation, there is a risk of the fire being propagated by a jet of ignited liquid.

BRIEF SUMMARY OF THE INVENTION

A process for double impregnation of electrical capacitors including at least one coil winding and a casing has now been found, characterized in that the following steps are performed:

a) the coil winding is impregnated with a dielectric fluid (A) and is then optionally subjected to a heat treatment, b) the excess of the said fluid (A) is removed, c) the casing containing the coil winding impregnated in a) is filled with a gelable composition including at least one polyol, at least one polyisocyanate, optionally at least one catalyst and the dielectric fluid (A) employed in a) and, d) the said gelable composition is gelled.

The excess of the said fluid (A) is here used to denote the quantity of the said fluid not retained by the coil winding.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a graph wherein the "number of surviving capacitors" versus "time (hours)" is plotted; and FIG. 2 is a graph wherein the change in capacity, $\Delta c/c$, versus the voltage gradient, V $\mu$m, is plotted.

DETAILED DESCRIPTION

According to the present invention the term coil winding is used to denote any winding consisting of a dielectric solid as thin layers separated by metallic armatures. The said armatures may consist of aluminium sheet, of doubly metallized paper or of the metallizing layer of the dielectric solid. The dielectric solid may be paper, a polyolefin such as polypropylene, a polyester or a combination of these materials.

According to the present invention, the dielectric fluid (A) is chosen from the group consisting of alkylbenzenes such as decylbenzene or dodecylbenzene, alkylpolyaromatic compounds like monoisopropylbiphenyl (MIPB) or phenylxylylethanes (PXE), mixtures of benzyltoluenes and (benzyl)benzyltoluenes such as those described especially in European Patent No. 136230, mixtures of mono- and bis(methylbenzyl)xylenes such as those described in European Patent Application No. 0443899, mixtures of benzyltoluene and diphenylethane, alkyl phthalates such as dibutyl phthalate or dioctyl phthalate, aliphatic esters such as dioctyl sebacate, dioctyl adipate or dibutyl sebacate, vegetable oils such as rapeseed oils, corn oils, castor oil and soya oils, and the combination of at least two of the abovementioned dielectric fluids.

In the case of a capacitor with a polypropylene film and aluminium armature, use will preferably be made of mixtures of benzyltoluenes and of (benzyl)benzyltoluenes including from 50% to 90% by weight of benzyltoluenes (mixture of the o, m and p isomers) and from 50% to 10% by weight of (benzyl)benzyltoluenes.

In the case of a capacitor with metallized armatures, use will preferably be made of a rapeseed oil, an aliphatic ester such as dibutyl sebacate, dioctyl phthalate, dodecylbenzene, a mixture of at least two of the dielectric fluids mentioned above or a mixture of rapeseed oil and of the benzyltoluenes-(benzyl)benzyltoluenes mixture.

According to the present invention the polyisocyanate employed for preparing the gelable composition may be chosen from aromatic, aliphatic and cycloaliphatic polyisocyanates and those which contain an isocyanurate ring in their molecule, which have at least two isocyanate functional groups in their molecule, capable of reacting with hydroxyl functional groups of a polyol to form a three-dimensional polyurethane network causing a gelling of the composition.

By way of illustration of aromatic polyisocyanates which can be employed according to the present invention there will be mentioned 4,4'-diphenylmethane diisocyanate (MDI), polymeric MDIs and triphenylmethane triisocyanate.

By way of illustration of an aliphatic polyisocyanate which can be employed according to the present invention there will be mentioned the biuret of diisocyanato-1,6-hexane.

By way of illustration of cycloaliphatic polyisocyanates there will be mentioned isophorone diisocyanate (IPDI), cyclohexyl diisocyanate (CHDI) and 4,4'-dicyclohexylmethane diisocyanate.

By way of illustration of polyisocyanates which contain the isocyanurate ring in their molecule there will be mentioned hexamethylene diisocyanate trimers marketed by Rhone-Poulenc under the name Tolonate HDT and tris[1-(isocyanatomethyl)-1,3,3-trimethylcyclohexane] isocyanurate marketed by Hüls under the name Vestanat T 1890/100.

The quantity of polyisocyanate according to the present invention is chosen such that the NCO/OH molar ratio is close to 1 and preferably between 0.85 and 1.15.

The polyol which can be employed according to the present invention may be chosen from polyesterpolyols, polyetherpolyols, polythioetherpolyols, polyacetalpolyols, polycarbonatepolyols, polyesteramidepolyols, polyamidepolyols, polydienepolyols, castor oil and the mixture of at least two of the abovementioned polyols.

By way of polyesters carrying hydroxyl groups there will be mentioned products of reaction of polyvalent, preferably divalent, alcohols, optionally accompanied by trivalent alcohols, and of polyvalent, and preferably divalent, carboxylic acids. Instead of free polycarboxylic acids it is also possible to employ for the preparation of the polyesters the anhydrides of corresponding polycarboxylic acids or esters of polycarboxylic acids and of corresponding lower alcohols or mixtures thereof. The polycarboxylic acids may be aliphatic, cycloaliphatic, aromatic and/or heterocyclic in nature and optionally substituted, for example by halogen atoms, and/or saturated.

By way of illustration of such carboxylic acids and derivatives there will be mentioned: succinic, adipic, suberic, azelaic, sebacic, phthalic and trimellitic acids, phthalic, tetrahydrophthalic, hexahydrophthalic, tetrachlorophthalic, endomethylenetetrahydrophthalic and glutaric anhydrides, maleic acid, maleic anhydride, fumaric acid, dimerized and trimerized unsaturated fatty acids optionally mixed with monomeric unsaturated fatty acids like oleic acid, dimethyl terephthalate and bisglycol terephthalate.

Among the polyvalent alcohols there will be mentioned, for example, 1,2-ethanediol, 1,2- and 1,3-propanediol, 1,4- and 2,3-butanediol, 1,6-hexanediol, 1,8-octanediol, neopentyl glycol, 1,4-bishydroxymethylcyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, formitol, methylglucoside, and also diethylene glycol, triethylene glycol, tetraethylene glycol and higher polyethylene glycols, dipropylene glycol and higher propylene glycols and dibutylene glycol and higher polybutylene glycols. The polyesters may carry carboxyl groups in some end positions. It is also possible to employ polyesters of lactones, for example of ε-caprolactone, or of hydroxycarboxylic acids, for example of ω-hydroxycaproic acid.

The polyetherpolyols which can be employed according to the invention, carrying at least 2, in general 2 to 8, preferably 2 to 3 hydroxyl groups, are those of the type known per se which are obtained, for example, by polymerization of epoxides like ethylene oxide, propylene oxide, butylene oxide, tetrahydrofuran, styrene oxide or epichlorohydrin with themselves, for example in the presence of Lewis catalysts such as $BF_3$ or by addition of these epoxides, preferably of ethylene oxide and of propylene oxide, optionally as a mixture or successively, to starting components carrying reactive hydrogen atoms, like water, the alcohols, aqueous ammonia or amines, for example 1,2-ethanediol, 1,3 or 1,2-propanediol, trimethylolpropane, glycerol, sorbitol, 4,4'-dihydroxydiphenylpropane, aniline, ethanolamine or ethylenediamine. It is also possible to employ sucrose polyethers or polyethers condensed onto formose.

By way of polythioetherpolyols there will be mentioned in particular the products of condensation of thiodiglycol with itself and/or with other glycols, dicarboxylic acids, formaldehyde and aminocarboxylic acids or amino alcohols. Depending on the nature of the second component the products obtained are, for example, mixed polythioethers, polythioetheresters or polythioetheresteramides.

By way of illustration of polyacetalpolyols there will be mentioned, for example, those which can be prepared from glycols like diethylene glycol, triethylene glycol, 4,4'-dihydroxylethoxydiphenyl-dimethylmethane, hexanediol and formaldehyde. It is also possible to employ polyacetals obtained by polymerization of cyclic acetals like, for example, trioxane.

By way of illustration of polycarbonates carrying hydroxyl groups there will be mentioned those of a type known per se which are obtained, for example, by reaction of diols like 1,3-propanediol, 1,4-butanediol and/or 1,6-hexanediol, diethylene glycol, triethylene glycol, tetraethylene glycol or thiodiglycol with diaryl carbonates, for example diphenyl carbonate or phosgene.

By way of illustration of polyesteramidepolyols and polyamidepolyols there will be mentioned, for example, the mainly linear condensates obtained from saturated or unsaturated polyvalent carboxylic acids and their anhydrides and saturated or unsaturated polyvalent amino alcohols, diamines, polyamines and mixtures thereof.

It is also possible to employ polyols already containing urethane or urea groups, and optionally modified natural polyols like castor oil.

By way of illustration of polydienepolyols which can be employed according to the present invention there will be mentioned hydroxytelechelic conjugated diene oligomers which can be obtained by various processes, such as the radical polymerization of conjugated diene containing from 4 to 20 carbon atoms in the presence of a polymerization initiator such as hydrogen peroxide or an azo compound such as azobis-2,2'-[2-methyl, N-(2-hydroxyethyl) propionamide] or the anionic polymerization of conjugated diene containing from 4 to 20 carbon atoms in the presence of a catalyst such as naphthalenedilithium.

According to the present invention the conjugated diene of the polydienepolyol is chosen from the group including butadiene, isoprene, chloroprene, 1,3-pentadiene and cyclopentadiene.

According to the present invention a polydienepolyol based on butadiene will be preferably employed.

Also suitable are the copolymers of conjugated dienes and of vinyl and acrylic monomers such as styrene or acrylonitrile.

It would not constitute a departure from the invention if hydroxytelechelic butadiene oligomers epoxidized on the chain or else hydrogenated hydroxytelechelic oligomers of conjugated dienes were employed.

According to the present invention the polydienepolyols may have number-average molecular masses of at most 7000 and preferably between 1000 and 3000. They have functionalities ranging from 1 to 5 and preferably between 1.8 and 3.

By way of illustration of polydienepolyols there will be mentioned the hydroxytelechelic polybutadienes marketed by Elf Atochem S.A. under the names Poly Bd®R45 HT and Poly Bd®R20 LNM.

According to the present invention the gelable composition may include one or more polyols of low molar mass in addition to the polyol.

A polyol of low molar mass is intended to mean polyols which have molar masses ranging from 50 to 800.

By way of illustration of such polyols there may be mentioned ethylene glycol, propylene glycol, diethylene glycol, dipropylene glycol, polyetherpolyols, 1,4-butanediol, 1,6-hexanediol, 2-ethylhexane-1,3-diol, N,N-bis (2-hydroxypropyl)aniline, 3-methyl-1,5-pentanediol, trimethylolpropane, pentaerythritol, propoxylated bisphenol A marketed by Akzo under the name Dianol 320 and the mixture of at least two abovementioned polyols.

In the event that a polyol of low molar mass is employed, the NCO/OH molar ratio will have to be calculated by taking into account the hydroxyl functional groups contributed by the said polyol of low molar mass.

Although the use of a catalyst is not indispensable, in some cases it would be possible, if desired, to employ a catalyst which can be chosen from the group including tertiary amines, imidazoles and organometallic compounds.

By way of illustration of tertiary amines there may be mentioned 1,4-diazabicyclo[2.2.2]octane (DABCO) and N,N,N',N",N"-pentamethyldiethylenetriamine.

By way of illustration of organometallic compounds there may be mentioned dibutyltin dilaurate, dibutyltin acetate and organic bismuth derivatives.

The gelable composition of the present invention can be produced by mixing the various constituents at ambient temperature (approximately 20° C.) by any means of mixing sufficient to ensure good dispersion of the constituents.

It can also be carried out according to a procedure described in European Patent Application No. 0743655 A1, incorporated into the present application by reference.

According to this procedure a mixture (B) is prepared separately by dissolving one or more polyols in the dielectric fluid (A), and a mixture (C) by dissolving one or more isocyanates in the dielectric fluid (A), and then each of the mixtures (B) and (C) obtained is separately placed in contact with an absorbent earth such as attapulgite at a temperature of between 20° C. and 80° C. for a period of at least one hour.

Next, the absorbent earth is removed from the mixtures (B) and (C) by filtration and the mixtures (B) and (C) thus treated are mixed by any means which make it possible to obtain good homogenization.

The weight quantity of dielectric fluid (A) in each of the mixtures (B) and (C) is at least 40% and preferably between 85% and 99.5% of the mixtures (B) and (C).

The mixtures (B) and (C) may also contain one or more additives such as antioxidants, epoxides, anthraquinone and derivatives.

A person skilled in the art will determine the weight quantities of the mixtures (B) and (C) and the added quantities of dielectric fluid (A), to be brought into contact during the preparation of the said gelable composition, so as to obtain a final composition which has an NCO/OH molar ratio of between 0.85 and 1.15 and including at least 40% by weight of dielectric fluid (A).

According to the present invention the double impregnation of the electrical capacitors is performed according to the preferred method hereinafter, which consists in performing the impregnation of the coil winding with the dielectric fluid (A) preferably at a temperature between the ambient (20° C.) and 80° C. and at reduced pressure.

The coil winding thus impregnated is next heated to a temperature of at least 60° C. and preferably of between 70° C. and 100° C. for at least one hour (step a).

This heat treatment is commonly referred to as forming.

The excess dielectric fluid (A) is then removed, optionally after cooling, and the casing is filled with the gelable composition prepared as described above, the coil winding being completely coated with the said composition.

When the operation of filling the casing is finished, the said casing is left at ambient temperature until the gelling reaction has taken place completely.

The latter may be advantageously accelerated by heating and/or by addition of a catalyst which may be added at the time of the preparation of the gelable composition.

Next, the casings are closed.

The capacitors impregnated according to the process of the present invention exhibit better resistance to partial discharges than capacitors which are entirely impregnated (coil winding and casing) with the gelable composition alone or with the dielectric liquid (A) alone.

In addition they have the advantage of not leaking and not contributing to the propagation of a fire by spraying of liquid in the event of rupture of the casing.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding French application No. 97 01079, filed Jan. 31, 1997 is hereby incorporated by reference.

The examples which follow illustrate the invention.

EXAMPLES

I Capacitors with Aluminium Armatures Data Concerning the Capacitors

The insulation of the coil windings consists of two polypropylene films of thickness equal to 13.6 $\mu$m. The armatures consist of aluminium sheets of thickness equal to 6 $\mu$m.

The coil windings are placed in parallelepipedal casings which are closed after impregnation.

Dielectric Fluid Employed

Jarylec C101 (denoted hereinafter by Jarylec), consisting of 75% by weight of benzyltoluenes and of 25% by weight of (benzyl)benzyltoluenes containing 0.8 parts by weight of an epoxide (ERL 4221 from Union Carbide) per 100 parts by weight of the benzyltoluenes/(benzyl)benzyl-toluenes mixture and exhibiting a viscosity at 20° C. of 6.5 mPa s measured according to ASTM standard D-445.

Gelable Composition (I)

Constituents of the said composition

Jarylec

PolyBd® 45 HT (denoted hereinafter by PolyBd): hydroxytelechelic polybutadiene of $\overline{Mn}$ equal to 2800 (determined by steric exclusion chromatography), exhibiting a hydroxyl value $I_{OH}$, expressed in milliequivalents per gram (meq/g) equal to 0.83, a viscosity equal to 5000 mPa s at 30° C. and a relative density equal to 0.90, Tolonate HDT/LV (denoted hereinafter by Tolonate): tris (6-isocyanatohexyl) isocyanurate, exhibiting an NCO content equal to 23%, a functionality of approximately 3.4 and a viscosity at 25° C. equal to 1200 (±300) mPa s.

Preparation

In Jarylec are dissolved separately, on the one hand, PolyBd (mixture B) and, on the other hand, Tolonate (mixture C). 3 g of attapulgite per 100 g of mixture are added to each of the mixtures (B) and (C), the mixtures are stirred separately at ambient temperature for 3 hours and the mixtures are then filtered at reduced pressure. Next, the mixtures (B) and (C) are brought into contact in a glass reactor fitted with a stirrer.

The gelable composition (I) thus prepared includes, by weight:
94% of Jarylec,
5.2% of PolyBd,
0.8% of Tolonate.

Impregnation of the Capacitors (in accordance with the invention).

The coil windings of the capacitors are impregnated at reduced pressure at ambient temperature with Jarylec. Next, they are formed at 90° C. for 168 hours to allow the polypropylene film to swell and are cooled to ambient temperature and then emptied of excess Jarylec.

The casings containing the coil windings thus impregnated are filled at reduced pressure with the gelable composition (I) to which 500 ppm of dibutyltin dilaurate have been added. They are returned to atmospheric pressure and kept at ambient temperature until complete gelling and the casings are then closed.

Aging of the Capacitors 2 casings containing 10 coil windings were impregnated with:
Jarylec alone (casing and coil winding),
the gelable composition (I) alone (casing and coil winding),
and, according to the invention, with Jarylec and then the gelable composition (I) according to the procedure of the invention described above. The capacitors were subjected for 500 hours at 90° C. to an alternating voltage of 2400 V (90 V/μm). The direct current breakdown voltage was next measured at ambient temperature (20° C.) on the failure-free capacitors.

The results are reported in graph 1 and Table 1.

In graph 1 we have shown, as ordinate, the number of surviving capacitors and, as abscissa, the test period in hours.

In this graph 1 are also shown, using
——— the Jarylac impregnant alone,
– – – – the gelable impregnant composition (I) alone,
- - - - - - Jarylac/gelable composition (I).

TABLE 1

| IM-PREGNANT | NUMBER OF COIL WINDING FAILURES | BREAKDOWN VOLTAGE OF THE COIL SURVIVING WINDINGS | |
|---|---|---|---|
| | | MEAN (kV) | STANDARD DEVIATION (%) |
| Jarylec | 10 | 7.0 | 15.4 |
| Gelable composition (I) | 20 | — | — |
| Jarylec/gelable composition (I) | 3 | 7.0 | 8.6 |

II CAPACITORS WITH METALLIZED FILM

Data Concerning the Capacitors

The coil windings are manufactured with an aluminium-metallized rough polypropylene film marketed by Bolore under the designation PP2.

The film has a thickness of 7.4 Npm.

The coil windings are Schoop-processed with zinc to permit the connections and are placed in crimped parallelepipedal casings.

Dielectric Fluid Employed

Dibutyl sebacate (denoted hereinafter by DBS) exhibiting a viscosity at 20° C. equal to 3.9 mPa s.

Gelable Composition (II)

Constituents of the said composition
DBS,
Poly Bd,
Tolonate.

Preparation

The DBS is pretreated with attapulgite. To do this, the DBS to which 3% by weight of attapulgite has been added is mixed at 60° C. for 4 hours, is filtered at reduced pressure and is then degassed at 60° C..

The treated DBS, the Poly BD and the Tolonate are mixed next.

The gelable composition (II) thus prepared includes, by weight:
93.60% of DBS,
5.55% of Poly Bd,
0.85% of Tolonate.

Impregnation of the Capacitors (in accordance with the invention):

Before impregnation the capacitors undergo a treatment of 48 hours at 70° C., at reduced pressure, and then, after returning to 60° C., the coil windings are impregnated at reduced pressure with DBS treated as described above. Next, they are formed at 60° C. for 24 hours and are then emptied of the excess DBS.

The casings containing the coil windings thus impregnated are filled at reduced pressure with the gelable composition (II) to which 500 ppm of dibutyltin dilaurate have been added. Next, they are kept for one whole day at 60° C. and then, after having been closed, are heated to 90° C. for a week.

Aging of the Capacitors at Increasing Direct Voltages:

A capacitor consisting of a casing containing 2 coil windings, impregnated according to the procedure of the invention described above with DBS and then the gelable composition (II), a capacitor consisting of a casing containing 2 coil windings, impregnated with the gelable composition (II) alone (casing and coil winding) and a capacitor consisting of a casing containing 1 coil winding impregnated with DBS alone (casing and coil winding), are subjected to increasing direct voltages in 24-hour stages.

The temperature is maintained at 55° C. throughout the test period (during the weekends the voltage is returned to the level of the first stage 1480 V, 200 V/μm).

After each stage the capacity of the coil windings is measured.

The behaviour of the capacitors is evaluated in the form of curves: variation in capacity ΔC/C=f (voltage gradient), which are plotted in graph 2.

In this graph we have shown as ordinate the change in capacity ΔC/C, expressed in % at 55° C. and, as abscissa, the voltage gradient expressed in V/μm.

In this graph 2 are also shown, using:
——— the DBS impregnant alone,
– – – – the gelable impregnant composition (II) alone,
- - - - - - the DBS impregnant/gelable composition (II).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Capacitor with at least one coil winding, a casing and aluminum armatures, which is double impregnated by
   a) impregnating said coil winding with a dielectric fluid;
   b) removing excess dielectric fluid;
   c) filling said casing containing the coil winding impregnated in a) with a gelable composition including at least one polyol, at least one polyisocyanate, and the dielectric fluid employed in a); and
   d) gelling said gelable composition.

2. Capacitor according to claim 1, characterized in that in step a) the coil winding is impregnated with the dielectric fluid at a temperature of between 20° C. and 80° C. at a pressure below atmospheric pressure and the coil winding thus impregnated is next heated to a temperature of at least 60° C. for at least one hour.

3. Capacitor according to claim 1, characterized in that the dielectric fluid is chosen from the group consisting of alkylbenzenes, alkylpolyaromatic compounds, mixtures of benzyltoluenes and (benzyl)benzyltoluenes, mixtures of mono- and bis (methylbenzyl)xylenes, mixtures of (benzyl) toluene and of diphenylethane, alkyl phthalates, aliphatic esters, vegetable oils and combinations thereof.

4. Capacitor according to claim 1, wherein a mixture of benzyltoluenes and of (benzyl)benzyltoluenes is employed as the dielectric fluid.

5. Capacitor according to claim 1, wherein a mixture of at least two fluids selected from the group consisting of rapeseed oil, dibutyl sebacate, dioctyl phthalate and dodecylbenzene is employed as the dielectric fluid, or a mixture of rapeseed oil with a benzyltoluene/(benzyl)benzyltoluene mixture is employed as the dielectric fluid.

6. Capacitor according to claim 1, wherein the polyol is a hydroxytelechelic polybutadiene.

7. Capacitor according to claim 1, wherein the polyisocyanate contains an isocyanurate ring in its molecule.

8. Capacitor according to claim 1, wherein the gelable composition includes a catalyst.

9. Capacitor according to claim 8, characterized in that the catalyst is dibutyltin dilaurate.

10. Capacitor with at least one coil winding, a casing and a metalized film, which is double impregnated by
    a) impregnating said coil winding with a dielectric fluid;
    b) removing excess dielectric fluid;
    c) filling said casing containing the coil winding impregnated in a) with a gelable composition including at least one polyol, at least one polyisocyaunate, and the dielectric fluid employed in a); and
    d) gelling said gelable composition.

11. Capacitor according to claim 10, characterized in that in step a) the coil winding is impregnated with the dielectric fluid at a temperature of between 20° C. and 80° C. at a pressure below atmospheric pressure and the coil winding thus impregnated is next heated to a temperature of at least 60° C. for at least one hour.

12. Capacitor according to claim 10, characterized in that the dielectric fluid is chosen from the group consisting of alkylbenzenes, alkylpolyaromatic compounds, mixtures of benzyltoluenes and (benzyl)benzyltoluenes, mixtures of mono- and bis (methylbenzyl)xylenes, mixtures of (benzyl) toluene and of diphenylethane, alkyl phthalates, aliphatic esters, vegetable oils and combinations thereof.

13. Capacitor according to claim 10, wherein a mixture of benzyltoluenes and of (benzyl)benzyltoluenes is employed as the dielectric fluid.

14. Capacitor according to claim 10, wherein a mixture of at least two fluids selected from the group consisting of rapeseed oil, dibutyl sebacate, dioctyl phthalate and dodecylbenzene is employed as the dielectric fluid, or a mixture of rapeseed oil with a benzyltoluene/(benzyl)benzyltoluene mixture is employed as the dielectric fluid.

15. Capacitor according to claim 10, wherein the polyol is a hydroxytelechelic polybutadiene.

16. Capacitor according to claim 10, wherein the polyisocyanate contains an isocyanurate ring in its molecule.

17. Capacitor according to claim 10, wherein the gelable composition includes a catalyst.

18. Capacitor according to claim 17, characterized in that the catalyst is dibutyltin dilaurate.

* * * * *